ABSTRACT OF THE DISCLOSURE

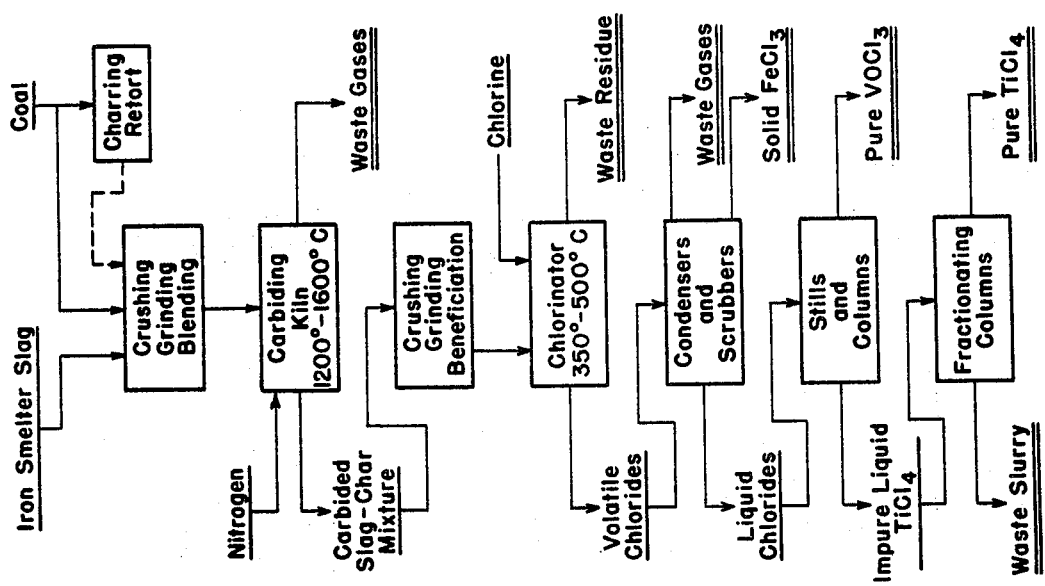
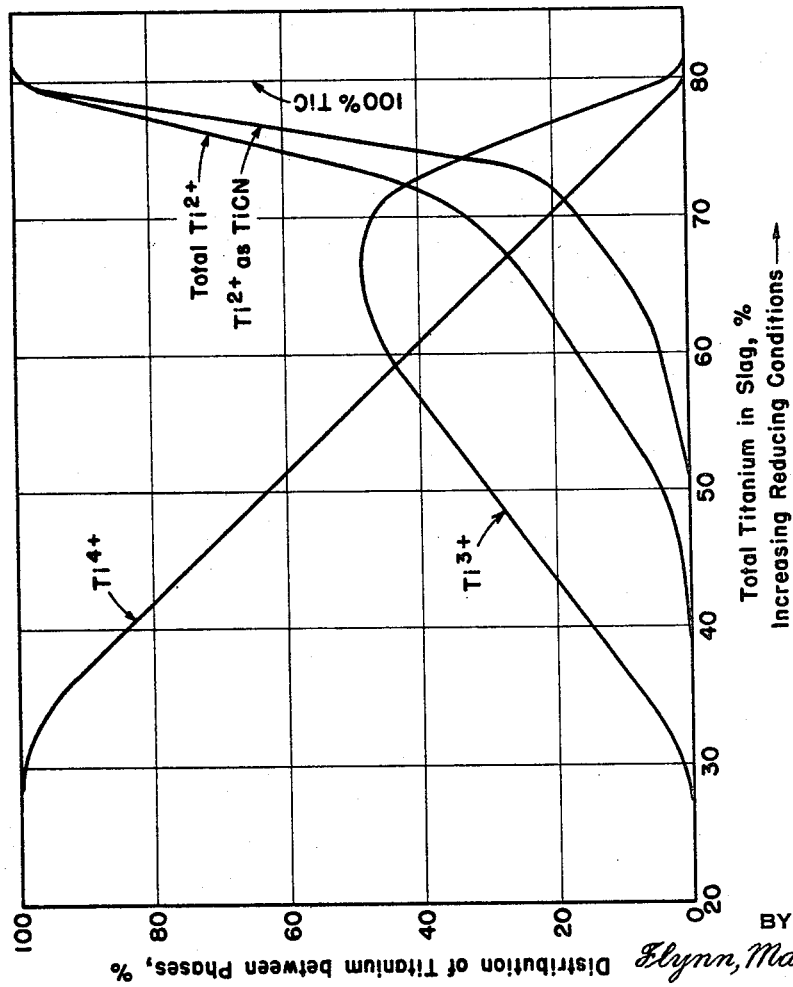
Fig. 2.
Fig. 1.
INVENTORS
Leonard E. Olds
Murray C. Udy
John R. Wesel
BY
Flynn, Marrn & Jangarathis
ATTORNEY 3,389,957
PROCESS FOR SELECTIVELY CARBID-
ING TITANIUM, IRON, AND VANADI-
UM VALUES
Leonard E. Olds, Grand Island, Murray C. Udy, Niagara
Falls, and John R. Wesel, Lewiston, N.Y., assignors to
Strategic Materials Corp., Niagara Falls, N.Y.
Filed Jan. 19, 1965, Ser. No. 426,590
8 Claims. (Cl. 23—16)

Titanium and vanadium values in complex materials such as slags are recovered as pure chlorides by selective carbiding of these values in preference to the gangue constituents. Carbiding is done in the solid state while in a nitrogenous atmosphere and at controlled times and temperatures. The reaction mass is then selectively chlorinated at low temperatures to give a vapor mixture of $TiCl_4$-$VOCl_3$ which is capable of high levels of purification by distillation.

---

This invention relates in general to metallurgy, and more particularly to the oxycarbiding of a metallurgical charge followed by chemical extraction of various elements contained therein. The process of the invention has particular application of the treatment of titaniferous metallurgical slags and like materials which also contain vanadium for the production of pure compounds. It has been established that compounds of this sort may be extracted as for example by chlorination at low temperatures and the metallic product recovered in substantially pure form as the chloride or, if desired, as the corresponding oxide.

Heretofore, the production of metallic carbides has generally been limited to supplying demand for refractory compounds; i.e., as end products in themselves. The reason for this is, of course, obvious when it is considered that they have extremely high melting points, are extremely hard to work with, and have a long history as undesired by-products of many metallurgical reactions. It is a significant feature of the present invention that pure carbides are not formed but rather oxynitrocarbides and oxycarbides of varying composition, and also that these compounds are not formed as end products, but rather as intermediates which are useful in the production of pure oxides, chlorides and, of course, the pure metals.

As is well known to those skilled in the metallurgical arts, the procedures of metallurgical thermochemistry (i.e., thermodynamics and kinetic reaction rate theory) may be applied to determine whether a given set of reactants will react, what temperature reaction will proceed towards completion, and the temperature at which the reaction will proceed at an appreciable rate. Thus it is possible, for example, when considering the formation of carbides, to plot the reactions of various metallic oxides with carbon for the production of metallic carbide and carbon monoxide and determine the approximate temperature at which the reaction will proceed at a substantial rate. When this is done, it is found that amongst the more common oxides the order of carbide conversion is as follows: iron, vanadium, chromium, manganese, titanium, silicon, boron, zirconium, calcium and aluminum. That is, it is found for example that iron and vanadium oxides will start to carbide below 1000° C. Other oxides form carbides at progressively higher temperatures up to aluminum oxide which forms carbide at temperatures in excess of 1800° C. The remaining elements listed above fall within these extremes.

While metallurgical thermochemistry is an aid in giving general indications as to which oxygen bearing compounds will readily form carbides, there are limitations on the conclusions which can be drawn therefrom. Thus, for example, many elements form a whole series of oxides and each oxide can react in many different ways to form various carbides and oxycarbides and also lower oxides. In the titania system, for example, more than a dozen different reactions may be set down, each having a different free energy and each proceeding towards completion at a different temperature. It is thus more difficult to establish which of the many possible reactions will actually take place when a quantity of a given oxide is reacted in the presence of carbon. Moreover, an element such as titanium has a high affinity for various other elements such as oxygen and nitrogen and this activity must be taken into account before reactions can be accurately predicted; it can generally be said that $TiO_2$ is readily reduced to $Ti_2O_3$ or to TiC but not to TiO. This is because at normal furnace temperatures in the range of 1400–1800° C. no reaction involving the formation of TiO alone has a negative free energy. On the other hand a reaction between TiO and carbon to yield TiC and the carbon monoxide has a highly negative free energy even at quite low temperatures.

Carbiding reactions are still more difficult to predict if, rather than using a pure oxide or mixture of pure oxides as starting materials, one must employ either a natural or synthetic mineral composition. Naturally, in the treatments of ores, slags and like materials this is most often the case. For example, as will be discussed in detail hereinafter, the present invention is readily applicable to the treatment of metallurgical slags resulting from the selective smelting of high-titania iron ores.

For many years workers have attempted to recover iron, titania or both from ilmenites, titaniferous magnetites and like materials. While many processes have been proposed, few have met with commercial success. The smelting of such materials for iron recovery has been achieved on an economic basis, however, and the present invention provides, for example, an economic method of recovering titania and vanadium oxide from the slags heretofore treatable only by sulfating. The original ore is selectively smelted for iron recovery, preferably according to the teachings of Marvin J. Udy in United States Patent No. 2,830,892 or Patent No. 2,878,114. The remaining slag is a complex composition, typical of which is the following:

|  | Percent |
|---|---|
| Feldspars (albite, orthoclase and anorthite) | 5.81 |
| Spinels ($MnO \cdot Al_2O_3$ and $MgO \cdot A_2O_3$) | 6.22 |
| Metasilicates ($FeO \cdot SiO_2$ and $CaO \cdot SiO_2$) | 6.84 |
| Titanates: | |
| $\quad Ti_3O_5$ | 8.65 |
| $\quad Al_2O_3 \cdot TiO$ | 18.43 |
| $\quad MgO \cdot 2TiO_2$ | 38.71 |
| $\quad FeO \cdot 2TiO_2$ | 8.79 |
| $\quad TiO_2$ | 4.18 |
| Vanadates: | |
| $\quad MgO \cdot V_2O_3$ | 1.40 |
| $\quad MgO \cdot V_2O_5$ | 0.22 |
| Carbides and elemental | 1.89 |

As can be seen from the foregoing, such a raw material is a mixture of complex compounds which normal thermochemical data will do little for the prediction of normal reaction temperatures and reaction rates.

In brief, the process of the present invention involves procedures wherein complex compositions such as the slag listed above, natural or synthetic ores and other oxidic mineral compositions may be selectively oxycarbided so that the desired element is brought to an activated state, whereby the following chemical extraction will be effective to extract the desired element or elements in substantially pure form. In one of its most important aspects, the present invention provides a method of oxycarbiding titania- and vanadia-bearing materials which renders the subsequent separation of the respective chlorides a simple and straightforward operation. This problem has heretofore been a major one which has led to a variety of complex chemical separations.

Before describing the process measures of the present invention in detail, it is believed advisable to discuss, briefly, some of the presently existing carbiding techniques, whereby it is believed a better understanding of the advances in the art made by the present invention will be gained. Typical among the prior art processes is one (United States Patent No. 2,869,990) wherein the raw material, generally a relatively pure oxide, is intimately admixed with carbon and briquetted, after being ground in a ball mill to substantially 100 percent minus 300 mesh. The briquettes are then fed into a vertical kiln having electrodes mounted therein, with a layer of metallurgical coke in lump form being introduced to form a bridge in the gaps between the electrodes providing thereby a smooth flow of current in the initial stages. The kiln is purged with a stream of hydrogen and after the air has been removed current is passed through the charge and carbonized briquettes removed from the bottom of the kiln while additional charge material is fed into the top. The furnace is run at approximately 1900° C. If the end product desired is cyanonitride rather than carbide, nitrogen instead of hydrogen is introduced into the kiln in a stoichiometrically sufficient quantity to react with descending carbide briquettes. While this process succeeds in forming good carbide, as would be predicted by the metallurgical thermochemistry of the system disclosed, the apparatus required is elaborate, a great deal of energy must be spent in briquetting and allied operations, and the product is in the form of a continuous structure of coke carbon with the oxide disseminated throughout. As the carbide in this process was desired as a final product per se, it was necessary that the raw material be substantially pure. This process has never achieved any commercial success due primarily to the inefficient use of electric current and the consequent high cost of producing the product.

A more directly comparable process has been reported for the production of titanium tetrachloride. A high-grade rutile concentrate is reduced with coke in an electric arc furnace to produce a mixture of titanium suboxides and some titanium carbide (combined carbon reported 1.7–2.8%) which is then chlorinated to produce a crude titanium tetrachloride, which is subsequently purified by conventional means. The need for high-grade rutile concentrate is the principal disadvantage of this process, but the presence of several percent of silicon tetrachloride in the finished product complicated purification procedures.

It is accordingly an object of the present invention to produce a metallic carbide product from a complex material which is amenable to chemical extraction of the desired carbide or carbides with the resulting product being recovered in substantially pure form, it being understood that the term "carbide" is used herein generically to mean a mixture of some pure carbides, oxycarbides and oxynitrocarbides of varying composition.

It is a further object of the invention to provide a process for the production of metallic carbides from a complex material which is efficient in the utilization of energy and is amenable to treatment in substantially any metallurgical reactor.

It is a still further object of the invention to provide a process for the production of metallic carbides from complex materials wherein only desired elements are carbided, which carbides are then subjected to chemical extraction by chlorination, forming the corresponding metallic chloride.

It is a still further object of the invention to provide a process wherein a titania- and vanadia-bearing material may be treated in such a manner that the separation of the resulting chlorides is a relatively simple task.

It is a still further object of the invention to provide a process for the recovery of desired elements from a complex mineral composition and involving carbiding followed by chemical extraction, wherein both the carbiding and extraction steps are carried out at relatively low temperatures.

A still further object of the invention is to provide a process for the production of metallic carbides from complex materials at low temperatures and without the necessity of a continuous coke structure.

Yet another object of the invention is to provide a process for the production of metallic carbides from a complex material wherein the desired element is brought to an activated state in the form of an oxycarbonitride which may then be chemically extracted in substantially pure form at a low temperature.

A further object of the invention is to produce a crude mixture of titanium and vanadium chlorides in which vanadium is present as vanadium oxychloride.

Various other objects and advantages of the invention will appear more readily from the following description of several typical embodiments of the invention, and the novel features as stated hereinbefore will be particularly pointed out with reference to the appended claims.

The present invention is based, at least in part, on the discovery that by carefully controlling process variables such as temperature, time at said temperature, carbon ratio, and physical factors such as particle size, and atmosphere and pressure, carbiding can be carried out on a selective basis in the solid state. Thus, for example, it has been found that a reactor operated at about 1400° C. in a neutral or reducing nitrogenous atmosphere will successfully oxycarbide the titanium and vanadium values in a complex, high-titania slag of the type described hereinabove, in the presence of a stoichiometric excess of carbon, a particle size in the range of 100 mesh, good blending of the carbon and slag, and slight compaction. It is to be noted that the reaction between the various titanates in the slag and the carbon is carried out by solid contact therebetween. Consequently, it is necessary to intimately admix the carbon and slag in a sufficiently small particle size so that solid state diffusion and reaction can take place. Compaction of the reactants is helpful in this case but not entirely necessary; in this regard the same parameters as are used in powder metallurgical techniques may be applied. Compaction also helps to prevent dust losses, of course, but too dense a mass will prevent escape of gaseous reaction products. While it has been determined that some compaction is desirable to insure intimate solid/solid contact, the degree of compaction depends more on the end use of the sinter; if a fine granular product is desired, pressing the bed at 100 p.s.i. is adequate (but does not eliminate dust), whereas briquetting can be employed where subsequent treatment allows.

The assignment of a specific stoichiometry to the reaction products is not possible, due to the fact that TiO, TiC and TiN form a continuous series of solid solutions. However, as pointed out hereinbelow, atmospheric control during carbiding provides a degree of selectivity which is essential to the successful production of pure products. The degree of selective carbiding achieved will become apparent from the examples appended hereinafter, and it is an easy matter to separate the respective chlorides of these compounds so that, upon chlorination, any iron chloride formed may be first condensed followed by condensation of, for example, titanium and vanadium chlorides which may then be separated by fractional distillation to produce pure products.

The key to this separation is the production of the oxycarbide of vanadium during the carbiding step. As pointed out hereinabove, the reduction is the result of a solid/solid reaction between added carbon and the raw material, and the solid products, lower oxides, nitrides and carbides, form a continuous series of solid solutions. The other reaction products are, of course, gaseous carbon oxides (CO and $CO_2$). It has been discovered that the presence of a nitrogenous atmosphere within the reactor affects the equilibrium of the various reactions taking place and, in effect, prevents the carbon from completely replacing the oxygen with the result that formation of oxy-compounds is favored to a very large degree. A certain amount of nitrogen enters the reaction, forming oxynitrides, but this is relatively unimportant compared to the effect of the nitrogen partial pressure in the reactor. In strong chlorine atmosphere titanium oxy-compounds [Ti(O,C,N), Ti(OC), etc.] will chlorinate to $TiCl_4$ just like TiC, but vanadium oxy-compounds [V(O,C)] will form the oxy-chloride ($VOCl_3$) on chlorination, and this is of essential importance.

A mixture of $TiCl_4$ and $VCl_4$ is essentially impossible to separate by fractional distillation procedures. While $VCl_4$ has a theoretically higher boiling point than $TiCL_4$, at the temperatures involved it breaks down into lower chlorides and chlorine which are very difficult to separate from the $TiCl_4$. The separation of $TiCl_4$ and $VOCl_3$ is stable at the temperatures involved.

The choice of a metallurgical reactor in which to carry out the carbide formation and chemical extraction is unimportant to the process of the invention; one skilled in the art will readily determine the best reactor for a particular raw material and a particular desired end product. Thus, for example, in one case it may be desirable to have a finely granular carbide product which may be extracted by flotation, magnetic separation or other ore-dressing techniques, in which case a tunnel kiln might be the best reactor for carbide formation. In another case it may be desirable to have the carbide product in a massive state, as for example, when it is desired to electrolyze the carbide in a molten-salt bath for deposition of pure metal, but in such a case, it is preferred to use a furnace for carbiding. When the carbide is chlorinated for extraction of the desired elements, various chlorinating reactors can be used, including fluidized beds, countercurrent cyclones, and the like. Reactor selection is thus seen to be dependent more on the particular embodiment of the invention employed and the size of the installation desired, rather than any technical limitations imposed by the process of the invention itself.

A more detailed understanding of the invention will be gained by referring to the following description thereof taken in conjunction with the accompanying drawings and in which, FIGURE 1 shows the relative amounts of lower valent titania present in a slag as a function of increased reducing conditions; and FIGURE 2 is a flow sheet or flow diagram illustrating one embodiment of the invention as applied to the treatment of a slag for recovery of titanium and vanadium chlorides.

FIGURE 1 is of interest in showing how titania in a slag changes in valency under increasing reducing conditions. Thus, titania in the 4+ state has essentially a straight-line relation approaching zero at about 80 percent Ti in the slag. Titania in the 3+ state is an intermediate reduction product reaching a high point between 60 and 70 percent Ti in the slag and Ti in the 2+ or nitrocarbide (or oxynitrocarbide) state increases during the latter phases of the reduction. Thus it can be seen that the amount of titania carbided in any given reduction operation will be a function of time and reducing conditions for any given temperature.

While the carbiding reaction for titanium oxide commences at about 1100° C., carbiding generally proceeds at a satisfactory rate and with satisfactory selectivity at a temperature of 1400° C. This might be considered the optimum temperature for the production of titanium oxynitrocarbide. It is also established that vanadium reacts at this temperature on a quantitative basis. Lower temperatures can also be used but when one drops much below 1200° C. the titanium reactions are generally incomplete unless long times are employed; as is well known such practice is generally uneconomical. For example at temperatures of the order of 1600° C. the reaction time may be as low as five minutes, whereas at temperatures as low as 1200° C. the reaction time may be as long as twenty-four hours, depending on the purity of the starting material. Temperatures above about 1600° C., however, do not effect oxycarbiding significantly.

In practice, the raw material is crushed to at least minus 100 mesh and intimately admixed with carbon. Coal, coke or char can be employed with only minor changes in the operating procedure. It is important to thoroughly mix the carbon and raw material together to insure complete admixture of the two components. To prevent gravity classification a small amount of water can be added. Carbon is added in excess of the stoichiometric quanity required, due to the fact that the reaction is solid/solid and physical contact is required. Also, a substantial excess of carbon functions to bring about a mass action effect and also to keep $CO_2$ away from the reaction zone. This excess carbon will survive the carbiding treatment as free carbon but, if its presence is not desired during the chemical extraction stage, the free carbon can be removed by a variety of well-known means such as gaseous classification, flotation, or the original particle size of the reductant could be such that at the end of carbiding only fines remain which could be blown away from the heavier carbides by a gas such as CO. Of course, it will be understood that when carbiding is going to be carried out in an electric furnace and the change rendered at least in part molten, the intimate mixture of finely-ground materials is not necessary. Typical carbon requirements, for a slag of the type described hereinabove, are 30–40 pounds of fixed carbon per 100 pounds of slag; further additions of carbon have little or no effect upon the carbiding reaction.

With regard to the extractability of the oxynitrocarbide, it has been found, as a general rule, that extractability improves with the amount of combined carbon contained in the carbide product. Thus, when combined carbon is, for example, between 3 and 10 percent, extractability by chlorination or other methods has been found to be generally 95 percent or higher. in some cases, however, extractability has been satisfactory with even lower quantities of combined carbon. When chlorination is the desired extraction step, it is found to be generally advantageous to employ a solid state carbiding reactor, such as a tunnel kiln or the like. The principal reasons for this is that the carbided product is still in granular form and chlorination may take place in a fluid bed reactor or the like without further granulation or comminution. Of course the relative cost of various forms of energy (coal, gas, oil, electric power) in a given location may be determinative.

A widely used process for the chlorination of rutile is carried out at approximately 900° C. in the presence of a substantial quantity of added carbon, and produces titanium tetrachloride according to the following reaction: $TiO_2 + 2C + 2Cl_2 = TiCl_4 + 2CO$. This reaction is usually effected at 900° C. or above and the yields are generally of the order of 85 to 90 percent. Of course, the rutile must have a substantial purity because at this temperature other elements will readily chlorinate along with the titanium, thus necessitating further substantial purification operations. Even previous low-temperature chlorinations, as noted hereinabove, have suffered from chlorination of impurities. According to the present invention, on the other hand, the entire product of the carbiding stage is subjected to the chlorination treatment, but yet the titanium tetrachloride produced is of substantial purity, depending of course on the amount of iron and vanadium in the raw material, and is in a form which is amenable to further processing to either titanium metal or pigment grade titania. Chlorination according to the present invention is carried out at a temperature of only 350 to 500° C. and without added carbon. The reaction goes to completion in a relatively short time and is in every way as satisfactory as the conventional high temperature method. The yields range from 90 to 95 percent. While not wishing to be bound by any particular theory of operation, since it is known that combinations of TiC, TiO and chlorine will react more readily than will $TiO_2$, it is believed that the complex oxynitrocarbide produced in the carbiding step of the invention follows the thermochemical parameters of the more simple compounds (TiO and TiC).

For best results and highest titania extraction during chlorination, it has been found that there should be at least 1.5–5 percent combined carbon in the Ti(O,C,N), particle size of 100 mesh or smaller has a limited effect, and two hours of chlorination has been found sufficient for complete extraction in substantially all cases. Two-stage chlorination is advantageous. Of course, those skilled in the art will realize that particle size and reaction time are inversely related. The effect of carbon and temperature during chlorination depends on the extent and amount of carbiding—i.e. how much $Ti^{++}$ phase has formed— These examples are for carbides in which appreciable $Ti^{3+}$ and $Ti^{4+}$ remain. It has been found that the nitrogen content made little difference in the extraction efficiency; nitrogen is important because of its ability to greatly increase the formation of V(O,C) and V(O,C,N), as explained hereinabove, and thus makes the separation easier.

The selectivity of the chlorination reaction at 350 to 500° C. is remarkably good. In all cases the chlorination of titanium, and vanadium values was substantially complete whereas silicon, calcium and aluminum were unaffected by the chlorine. As would be expected, the resulting chlorine consumption by impurities is very low and chlorine losses are hence kept at a minimum. Of course, chlorine used for chlorination of the desired metal products is recovered on conversion thereof to the pure oxide or the metal. With the aforementioned iron smelter slag, chlorine consumption averaged 0.11 pounds per pound of $TiO_2$ recovered. Of course, use of chlorine is not mandatory; treatment with $HCl, CCl_4, SCl_2$ and other halide reagents will be effective to produce the volatile products from the sinter.

It is worthy of emphasis to note that the exact type of carbide produced in accordance with the invention will vary with the composition of the complex material being treated. Thus, as explained heretofore, titanium forms an oxynitrocarbide due to its being a difficultly reducible element with a very high affinity for oxygen. This also holds true for other difficultly reducible materials such as zirconium, columbium and the like. More easily reduced metal oxides will, as would be expected, form the carbide directly without holding on to oxygen. Thus, iron, vanadium and chromium oxides will form various carbides directly. Generally speaking, it can be said that at 1400° C., chromium, iron, vandium and titanium oxides along with some manganese oxide will all form carbides. But in a nitrogenous atmosphere, the titanium and vanadium products will primarily be oxycarbides.

A better understanding of the process measures employed in the invention will be gained by referring to the examples appended hereinbelow, which are intended as illustrative only and not in a limiting sense.

EXAMPLE 1

A slag resulting from a selective iron smelting was treated as outlined in FIGURE 2 of the drawings. This slag had the following chemical analysis.

| | Percent |
|---|---|
| Ti oxides | 57.90 |
| V oxides | 1.28 |
| Fe and FeO | 5.69 |
| MnO | 1.20 |
| $SiO_2$ | 7.01 |
| $Al_2O_3$ | 15.73 |
| CaO | 1.54 |
| MgO | 9.12 |
| $Na_2O$ | 0.18 |
| $K_2O$ | 0.20 |
| SiC | 0.93 |
| $Fe_3C$ | 0.15 |
| C | 0.21 |

Mineralogical composition was approximately as noted hereinabove.

This slag was ground to −100 mesh and mixed with finely ground coal and a little water in a ball mill for one hour. The coal used had 49.9 percent fixed carbon, and was added on the basis of 36.8 pounds of fixed carbon to each 100 pounds of slag.

The intimately-mixed coal-slag mixture was slightly compacted and heated to 1380° C. for four hours in a gas-fired tunnel kiln having a high nitrogenous atmosphere within the mixture [40.5% CO; 5.8% H; and 53.7% N] after which it was air-cooled. The mixture lost 55 percent of its initial weight, but 6 percent was recovered as dust and fume; the remainder, of course, being loss of oxygen from the slag and loss of volatiles from the coal.

It was determined that the sinter resulting from the kiln treatment contained 3.54 percent combined carbon, and that this was sufficient to convert substantially all of the titanium and vanadium values to the divalent state. A second run using char (81.75% F.C.) on the same basis gave 3.4 percent combined carbon.

That losses were slight during carbiding can be seen from the following elemental analysis.

| | Percent |
|---|---|
| Ti | 37.29 |
| ($TiO_2$ equivalent=54.41%) | |
| V | 0.74 |
| Fe | 5.77 |
| Mn | 0.74 |
| Si | 3.88 |
| Al | 8.10 |
| Ca | 2.59 |
| Mg | 5.42 |
| Na | 0.19 |
| K | 0.15 |
| $N_2$ | 4.91 |
| $O_2$ | 19.44 |
| C (total) | 17.59 |

While it is difficult to show by analytical means that the sinter was selectively activated by the foregoing treatment, this becomes clear upon the subsequent treatment thereof, as set forth in Example II.

EXAMPLE II

The carbided sinter produced in Example I was chlorinated at a temperature of 400° C. in a horizontal tube furnace for a period of 2 hours. It was found that no appreciable agglomeration of the mixture took place during carbiding (i.e., it crumbled readily during handling) so no further comminution was required. It should be noted, however, that when fluid bed chlorination is employed, particle size is a more important operating parameter and comminution of the sinter may be desirable.

The results of chlorination illustrate the selective nature of the solid-state carbiding treatment, in that only constituents which have reacted with carbon therein will be chlorinated at the low temperature employed. For ease of comparison, analysis of both the sinter and of the residue after chlorination are given:

|  | Sinter, percent | Residue, percent |
|---|---|---|
| Ti | 37.29 | 1.37 |
| V | 0.74 | 0.044 |
| Fe | 5.77 | 2.17 |
| Mn | 0.74 | 0.83 |
| Si | 3.88 | 6.87 |
| Al | 8.10 | 15.08 |
| Ca | 2.59 | 4.20 |
| Mg | 5.42 | 9.68 |
| Na | 0.19 | 0.18 |
| K | 0.15 | 0.12 |
| $N_2$ | 4.91 | 0.99 |
| $O_2$ | 19.44 | 31.39 |
| C (total) | 17.59 | 27.30 |

Extraction of Ti was 98.1 percent, V was 97 percent removed, and Fe 80.8 percent. While it was calculated that about 50 percent of the sodium and potassium were also removed, such small amounts (0.1–0.2 percent) cause no trouble, and due to difficulties of analysis, are only estimates.

The volatile chlorides were first condensed to the point where ferric chloride was readily separated (below approximately 315° C.), and it was found that any other impurities present were removed at this stage, because the subsequent condensate was found to be a pure mixture of $TiCl_4$ and $VOCl_3$.

While the prior art indicates that it is impossible to separate $TiCl_4$ and $VCl_4$ by distillation, it was found that this may be done when the vanadium is present as $VOCl_3$ as explained previously. It has, moreover, been confirmed that the binary system involved contains no azeotropes which would prevent complete separation.

The $TiCl_4$-$VOCl_3$ mixture was distilled readily in laboratory apparatus to produce $VOCl_3$ of 99.8 percent purity, and this was hydrolyzed to produce 99.2 percent $V_2O_5$; the titanium values were of similar purity and produced pigment-purity titania.

EXAMPLE III

The procedures of Example I were repeated, with the exception that the slag-coal mixture was pressed into pillow-shaped briquettes prior to kiln treatment, it being known that briquettes of this shape are readily usable in a moving bed. Carbiding in the presence of nitrogen produced very hard porous briquettes, the early release of the volatile coal components leaving sufficient escape area for gaseous reduction products. Briquette breakage was below 2 percent, and dust losses were essentially eliminated.

The briquettes were crushed and chlorinated in a moving bed at 400° C. The exit gases were fed into a cyclone to separate dust from the gas stream; chlorination was just as efficient (in terms of extraction) as in Example II but, as expected, took somewhat longer (about 20 percent).

EXAMPLE IV

The process of the invention was carried out on a slag containing less titania than the material utilized in Example I. This slag had the following analysis:

|  | Percent |
|---|---|
| $TiO_2$ | 48.1 |
| Fe | 2.8 |
| $SiO_2$ | 15.9 |
| $Al_2O_3$ | 13.4 |
| CaO | 4.1 |
| MgO | 14.6 |
| MnO | 2.1 |
| V | 0.13 |

The results were in accordance with those of Examples I and II.

EXAMPLE V

The process of the invention was carried out on a material having a low titania content but a significant quantity of vanadium. This material had the following analysis:

|  | Percent |
|---|---|
| $TiO_2$ | 9.4 |
| Fe | 9.9 |
| $SiO_2$ | 35.1 |
| $Al_2O_3$ | 16.7 |
| CaO | 8.7 |
| MgO | 15.7 |
| MnO | --- |
| V | 1.91 |
| S | 0.09 |

Again, extraction and recovery were as good as reported in Examples I and II.

It will be understood that various changes in the details, materials and process steps, which have been herein described and illustrated in order to explain the nature of the invention, may be made by those skilled in the art within the principle and scope of the invention as expressed in the appended claims.

Having thus described the subject matter of the invention, what is desired to secure by Letters Patent is:

1. Process for the selective carbiding of titanium, iron and vanadium values contained in complex mineralogical and metallurgical materials that comprises,
intimately mixing said material in finely divided form with a stoichiometric excess of a finely divided carbonaceous reductant; and
heating said mixture in a nitrogenous atmosphere at a temperature between approximately 1200° C. and 1600° C. for a period of from twenty-four hours to five minutes, whereby said titanium an iron values are selectively carbided to form carbides, oxycarbides and oxynitrocarbides of varying stoichiometry, and said vanadium values are carbided to form oxycarbides and oxynitrocarbides, while gangue elements are are carbided, said atmosphere serving to keep carbon from completely replacing oxygen.

2. The process as claimed in claim 1, wherein said reductant and said material are essentially minus 100 mesh, and some water is added during mixing.

3. The process as claimed in claim 1 and further comprising compacting said mixture prior to heating, whereby solid/solid contact between reactants is improved.

4. Process for the recovery of titanium, iron and vanadium values from the product of claim 1 that comprises;
contacting the carbided mixture with a gaseous halide at a temperature of between approximately 350° C. and 500° C.;
separating the gaseous halides and oxyhalides thus produced from the solid residue;
cooling said gaseous halides and separating iron values therefrom;
condensing the remaining halides; and
recovering titanium and vanadium values as separate fractions by distillation.

5. Process for the recovery of titanium, iron and vanadium values from the product of claim 1 that comprises,
chlorinating the carbided mixture at a temperature of between approximately 350° C. and 500° C.;
separating the gaseous chlorides and oxychlorides thus produced from the solid residue;
cooling said gaseous chlorides to below about 315° C. and separating ferric chloride therefrom;
condensing the remaining chlorides to produce a $TiCl_4$-$VOCl_3$ mixture; and
recovering said $TiCl_4$ and $VOCl_3$ as separate fractions by distillation.

6. Process for the selective carbiding and recovery of titanium values from a material containing complex titanates, vanadates and other complex minerals that comprises,
intimately mixing said material in finely divided form with a stoichiometric excess of finely divided carbonaceous reductant;

heating said mixture in a nitrogenous atmosphere at a temperature between approximately 1350° C. and 1600° C. for from five minutes to twenty-four hours, whereby said titanates and vanadates are partially reduced and combine with carbon, a minor portion of metallic impurity carbides also being formed;

chlorinating said mixture at a temperature between about 350° C. and 500° C.;

separating and recovering the mixed gaseous titanium tetrachloride and vanadium oxychloride thus produced from impurities; and fractionally distilling the mixed chlorides to recover titanium and vanadium values as separate fractions.

7. Process for the activation and recovery of titanium and vanadium values from a material selected from the group consisting of complex titanium- and vanadium-bearing ores and slags that comprises, intimately mixing said material in finely divided form with a stoichiometric excess of finely divided carbonaceous reductant;

heating said mixture in a nitrogenous atmosphere at a temperature between 1350° C. and 1600° C. for from five minutes to twenty-four hours under conditions controlled to promote solid/solid reactions, whereby said titanium and vanadium values are reduced to various oxycarbides and gangue elements are not carbided, said atmosphere serving to prevent carbon from completely replacing oxygen;

chlorinating said mixture at a temperature between about 350° C. and 500° C. in the presence of added $CO_2$;

separating the resulting titanium tetrachloride and vanadium oxychloride by fractional distillation; and recovering said chlorides as separate products.

8. The process as claimed in claim 7, wherein said material contains a minor proportion of iron oxide, and further comprising separating ferric chloride from the mixed gaseous titanium and vanadium chlorides by cooling the gaseous chlorination products to below about 315° C.

References Cited

UNITED STATES PATENTS

| 2,869,990 | 1/1959 | Burgess | 23—208 |
| 3,161,472 | 12/1964 | Scott | 23—208 |
| 3,161,473 | 12/1964 | Pultz | 23—208 |
| 3,227,545 | 1/1966 | Hildreth | 23—140 X |

FOREIGN PATENTS 545,408  8/1957  Canada.

MILTON WEISSMAN, *Primary Examiner.*

HERBERT T. CARTER, OSCAR R. VERTIZ,
*Examiners.*

UNITED STATES PATENT OFFICE
CERTIFICATE OF CORRECTION

Patent No. 3,389,957                June 25, 1968

Leonard E. Olds et al.

It is certified that error appears in the above identified patent and that said Letters Patent are hereby corrected as shown below:

Column 6, line 36, "change" should read -- charge --; line 54, "reasons" should read -- reason --. Column 9, line 70, "accordance" should read -- accord --. Column 10, line 23, after "what" insert -- it --; line 33, "an" should read -- and --; line 38, "are are" should read -- are not --.

Signed and sealed this 24th day of February 1970.

(SEAL)
Attest:

Edward M. Fletcher, Jr.
Attesting Officer

WILLIAM E. SCHUYLER, JR.
Commissioner of Patents